United States Patent
Kingsbury et al.

(10) Patent No.: US 10,607,595 B2
(45) Date of Patent: Mar. 31, 2020

(54) GENERATING AUDIO RENDERING FROM TEXTUAL CONTENT BASED ON CHARACTER MODELS

(71) Applicant: Lenovo (Singapore) Pte. Ltd., New Tech Park (SG)

(72) Inventors: Timothy Robert Kingsbury, Cary, NC (US); Robert James Kapinos, Durham, NC (US); Scott Wentao Li, Cary, NC (US); Russell Speight VanBlon, Raleigh, NC (US)

(73) Assignee: LENOVO (SINGAPORE) PTE. LTD., New Tech Park (SG)

( * ) Notice: Subject to any disclaimer, the term of this patent is extended or adjusted under 35 U.S.C. 154(b) by 11 days.

(21) Appl. No.: 15/670,117

(22) Filed: Aug. 7, 2017

(65) Prior Publication Data

US 2019/0043474 A1 Feb. 7, 2019

(51) Int. Cl.
| | | |
|---|---|---|
| *G10L 13/10* | (2013.01) | |
| *G10L 13/047* | (2013.01) | |
| *G10L 13/033* | (2013.01) | |
| *G06N 3/00* | (2006.01) | |
| *G06F 17/21* | (2006.01) | |
| *G06F 17/27* | (2006.01) | |
| *G06N 20/00* | (2019.01) | |
| *G06N 3/08* | (2006.01) | |
| *G06N 5/00* | (2006.01) | |

(52) U.S. Cl.
CPC ............ *G10L 13/10* (2013.01); *G06F 17/218* (2013.01); *G06F 17/279* (2013.01); *G06N 3/006* (2013.01); *G10L 13/0335* (2013.01); *G10L 13/047* (2013.01); *G06N 3/08* (2013.01); *G06N 5/003* (2013.01); *G06N 20/00* (2019.01)

(58) Field of Classification Search
None
See application file for complete search history.

(56) References Cited

U.S. PATENT DOCUMENTS

| | | | | |
|---|---|---|---|---|
| 7,155,158 | B1* | 12/2006 | Iuppa | G09B 9/003 434/350 |
| 10,180,939 | B2* | 1/2019 | Nanavati | G06F 17/279 |
| 2002/0184027 | A1* | 12/2002 | Brittan | G10L 13/047 704/258 |
| 2008/0007567 | A1* | 1/2008 | Clatworthy | G06Q 30/02 345/619 |
| 2013/0066632 | A1* | 3/2013 | Conkie | G10L 13/10 704/260 |
| 2015/0161809 | A1* | 6/2015 | Murdock | G06T 13/40 345/474 |

(Continued)

*Primary Examiner* — Abul K Azad
(74) *Attorney, Agent, or Firm* — Dean D. Small; The Small Patent Law Group, LLC

(57) ABSTRACT

A computer implemented method, device and computer program product are provided. The method, device and computer program product utilize textual machine learning to analyze textual content to identify narratives for associated content segments of the textual content. The method, device and computer program further utilize textual machine learning to designate character models for the corresponding narratives and generate an audio rendering of the textual content utilizing the character models in connection with the corresponding narratives for the associated content segments.

17 Claims, 6 Drawing Sheets

(56) References Cited

U.S. PATENT DOCUMENTS

| | | | |
|---|---|---|---|
| 2015/0235097 A1* | 8/2015 | Wang | G06K 9/00865 |
| | | | 382/159 |
| 2015/0332665 A1* | 11/2015 | Mishra | G10L 15/1815 |
| | | | 704/257 |
| 2017/0154049 A1* | 6/2017 | Catalano | G06F 16/958 |

* cited by examiner

US 10,607,595 B2

GENERATING AUDIO RENDERING FROM TEXTUAL CONTENT BASED ON CHARACTER MODELS

FIELD

The present disclosure relates generally to generating audio renderings from textual content based on character models.

BACKGROUND OF THE INVENTION

Today, a variety of books and novels are offered as audiobooks that are typically narrated by a professional narrator, well-known actor/actress and the like. However, a significant number of books and other text material is not available in audiobook format. More recently, automated solutions have been offered to convert text to speech. Automated text to speech converters are useful in situations where a user wants to listen to a book that is not available in audiobook format.

However, conventional automated text to speech converters suffer certain limitations. For example, with fictional books, the quality of the text to speech conversion is limited. Also, with professionally narrated books, the narrators can provide unique voices for each character in a novel. However, conventional automated text to speech converters produce common a computer generated voice for all characters when reading a book. The computer generated voice affords a poor substitution for a professional voice actor. For example, in-home digital personal assistants are capable of reading novels aloud. However, the quality of the voice narration is severely limited.

A need remains for improved methods, devices and computer program products that generate audio renderings from textual content.

SUMMARY

In accordance with embodiments herein, a computer implemented method that is under control of one or more processors configured with specific executable program instructions is provided. The method analyzes textual content to identify narratives for associated content segments of the textual content. The method designates character models for the corresponding narratives and generates an audio rendering of the textual content utilizing the character models in connection with the corresponding narratives for the associated content segments.

Optionally, the method utilizes textual machine learning to designate the character models to simulate different characters within a book, the characters differing from one another by one or more of age, sex, race, nationality or personality traits. The content segments may represent sections of spoken dialogue by different individual speakers, and wherein the machine learning assigns different character models for the individual speakers.

Optionally, the method utilizes textual machine learning to designate different intonations to be utilized by at least one of the character models in connection with sections of the corresponding narrative and may identify a dialogue tag associated with the content segment and assigning at least one of the intonations based on dialogue tag.

Optionally, the textual content may represent a story and the audio rendering may include a first character model representing a narrator and secondary character models representing characters within the story. Textual content may include dialogue tags, the method further comprising removing the dialogue tags from the audio rendering. The method may receive feedback regarding one or more character models in the audio rendering and adjusting the one or more character models based on the feedback.

In accordance with embodiments herein, a device is provided that is comprised of a processor and a memory storing program instructions accessible by the processor. Responsive to execution of the instructions, the processor analyzes textual content to identify narratives for associated content segments of the textual content; designates character models for the corresponding narratives; and generates an audio rendering of the textual content utilizing the character models in connection with the corresponding narratives for the associated content segments.

Optionally, the processor may designate the character models to simulate different characters within a book, the characters differing from one another by one or more of age, sex, race, nationality or personality traits. The processor may step through content segments and assign the content segment to a new narrative or a pre-existing narrative. The processor may designate different intonations to be utilized by at least one of the character models in connection with sections of the corresponding narrative.

Optionally, the processor may compare current and pre-existing narrative traits to determine whether to update or replace the corresponding character model.

Optionally, the textual content may represent a story and the audio rendering may include a first character model representing a narrator and secondary character models represent characters within the story. The textual content may include dialogue tags, and the processor may remove the dialogue tags from the audio rendering. The processor to may receive feedback regarding one or more character models in the audio rendering and adjust the one or more character models based on the feedback.

In accordance with embodiments herein, a computer program product comprising a non-signal computer readable storage medium comprising computer executable code for an audio rendering of textual content utilizing character models in connection with corresponding narratives, the narratives defined by associated content segments within the textual content, the character models designated for the corresponding narratives utilizing textual machine learning is provided.

Optionally, the computer executable code may comprise the character models to simulate different characters within a book, the characters differing from one another by one or more of age, sex, race, nationality or personality traits. The computer executable code may designate different intonations to be utilized by at least one of the character models in connection with sections of the corresponding narrative. The content segments may represent sections of spoken dialogue by different individual speakers, and wherein the computer executable code to assign different character models for the individual speakers.

DETAILED DESCRIPTION

Figure 1:
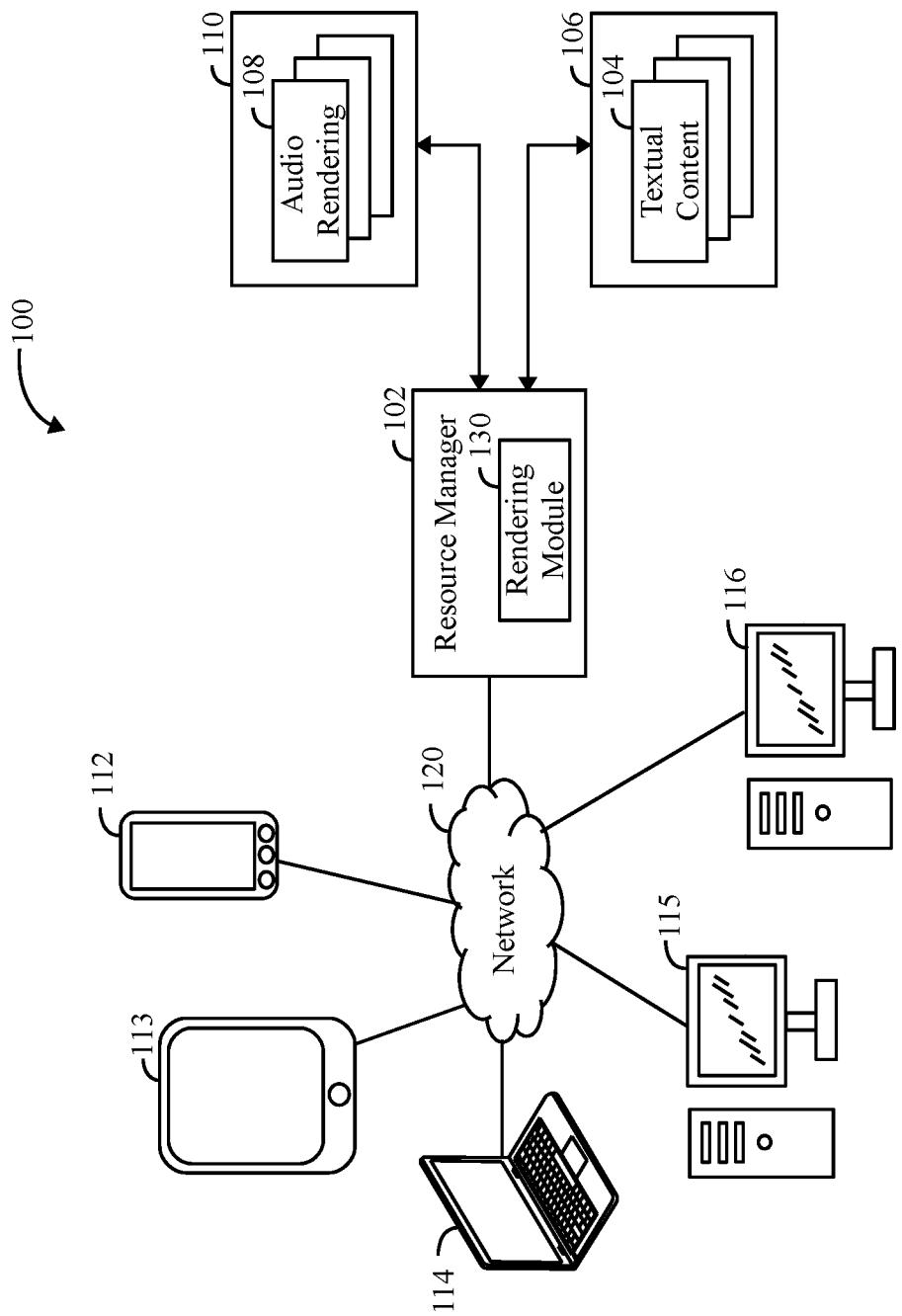
FIG. 1 illustrates a system formed in accordance with embodiments herein that utilizes textual machine learning to analyze textual content and generate audio renderings of the textual content.

It will be readily understood that the components of the embodiments as generally described and illustrated in the Figures herein, may be arranged and designed in a wide variety of different configurations in addition to the described example embodiments. Thus, the following more detailed description of the example embodiments, as represented in the Figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

Terms

The term "textual content" refers to any and all textual, graphical, image or video information or data that may be converted to corresponding audio information or data. The textual content may represent various types of incoming and outgoing textual, graphical, image and video content including, but not limited to, electronic books, electronic stories, correspondence, email, webpages, technical material, text messages, social media content, alerts, advertisements and the like.

The term "audio rendering" refers to an audio file or audio output that is generated based on textual content. For example, an audio rendering may represent an electronic file that may be saved and replayed. As another example, an audio rendering may represent an audio output played over speakers in real time during the rendering process. The audio file may be saved in various formats, such as MP3, WAV, WMA, Opus, etc. Optionally, the audio file may represent a speech synthesis formatted file that is converted/played at an end electronic device. Non-limiting examples of the audio file format are Speech Synthesis Markup Language (SSML) and Microsoft's SAPI text to speech file formats.

The term "intonation" refers to tonal, emotional and other qualities of dialogue, including but not limited to accent, accentuation, stress, modulation, cadence, pitch, inflection, and/or timbre. Other non-limiting examples include shouting, whispering, expressing surprise, casual conversation, talking fast, talking slow and the like.

The term "character model" refers to a set of characteristics that define a character or voice. For example, the characteristics may designate an age, gender/sex, race, nationality and other basic personality traits for an individual character. The characteristics within the character model may further indicate the dialect to designate (e.g., the speech that reflects pronunciation, vocabulary and grammar typical of a geographic region). As one example, a first character model may be designated to correspond to a narrator of a story, where the narrator represents a person or character who is telling a story, filling in background information and/or bridging gaps between dialogue. As further examples, secondary characteristic models may be designated in different types of stories, books, textual content and the like. As one example, when the textual content represents correspondence (e.g., email or text messages), the characteristic model may designate an individual to simulate a family member, friend, coworker, staff person and the like.

The terms "textual machine learning" and "machine learning" refer to an artificial intelligence algorithm that learns from various automatic or manual feedback, such as observations and/or data. The machine learning algorithm is adjusted over multiple iterations based on the observations and/or data. For example, the machine learning algorithm is adjusted by supervised learning, unsupervised learning, and/or reinforcement learning (e.g., customer feedback). Non-limiting examples of machine learning algorithms are a decision tree, K-means, deep learning, artificial neural network, and/or the like.

Overview

FIG. 1 illustrates a system formed in accordance with embodiments herein that utilizes textual machine learning to analyze textual content and generate audio renderings of the textual content. The system 100 includes a resource manager 102 that performs the various processes described herein. Among other things, the resource manager 102 accesses textual content 104 stored in memory 106. Non-limiting examples of the types of textual content 104 that may be accessed include a book, novel, article, technical material, webpage, text message, email and the like. The resource manager 102 includes a rendering module 130 that implements textual machine learning to generate audio renderings 108 from the textual content 104 and store the audio renderings 108 in memory 110. The resource manager 102 communicates with various types of electronic devices 112-116 over a network 120. The resource manager 102 provides the audio renderings 108 to the requesting electronic devices 112-116 over the network 120. Optionally, the resource manager 102 may receive the textual content 104 from the electronic devices 112-116, convert the textual content 104 to an audio rendering 108 and return the audio rendering 108 to the original electronic device 112-116 (e.g., as an MP3 file, WAV file, SSML file).

The rendering module 130 implements a machine learning algorithm that parses through content segments of the textual content 104, identifies a character model to be associated with a corresponding content segment and generates a corresponding segment of the audio rendering utilizing an identified character model. The content segments represent sections of spoken dialogue by different individual speakers associated with separate narratives. As described herein, the machine learning algorithm of the rendering module 130 assigns different character models for the individual speakers. As explained herein, character models are defined to simulate speech of different types of individuals. For example, the machine learning algorithm of the rendering module 130 designates the character models to simulate different characters within a book, where the characters differ from one another by one or more of age, sex, race, nationality, or personality traits.

In addition, the rendering module 130 assigns different intonations to content segments in order to add further personalization and dramatization to the audio rendering. The machine learning algorithm of the rendering module 130 designates different intonations to be utilized by at least one of the character models in connection with sections of the corresponding narratives.

The machine learning algorithm of the rendering module 130 receives feedback continuously or intermittently. Additionally or alternatively, the machine learning algorithm of the rendering module 130 may perform training, in which predetermined text is provided, from which the rendering module 130 generates an output. The output is then adjusted through user inputs from electronic device 112-116. The training may also include matching a character to character names within one or more books, novels, etc. For example, a list of male names may be assigned to a male characteristic. Thus, when a name is on the list identified in a book, the rendering module 130 knows to assign a male character. Similarly, other terminology may be associated with particular characteristics. For example, descriptions of certain geographic areas, speech patterns and the like may be assigned to an urban or rural characteristic, a particular nationality or other demographic characteristic and the like. When words are identified in a book associated with the geographic area or speech pattern, a character is assigned having the corresponding urban or rural characteristic, nationality or other demographic characteristic.

The machine learning algorithm of the rendering module 130 builds a profile for each voice, where a particular voice is associated with a character model. The character model has a corresponding set of characteristics that define the voice. The set of characteristics may include prerecorded segments of speech from a particular individual (e.g., a professional narrator, actor/actress, sports individual). The profile for each voice and corresponding character model may be initially generated based in part on inputs from a user. The profile may be continuously updated as additional textual content is analyzed. For example, a character model may be continuously updated over the course of converting a large number of books, novels and the like.

Optionally, the resource manager 102 may produce multiple audio renderings 108 in connection with a single textual content 104 file (e.g., single book). For example, the resource manager 102 may produce audio renderings in different languages in connection with a single book for different target customers/users. From one book, the resource manager 102 may produce two or more audio renderings that utilize different character models for a common character in the book based on an age or other demographic characteristic of the target customer/user. For example, a book may be converted into an adult-type audiobook format where the voices of the characters are adults and the audio rendering is provided to customers/users who are adults. The same book may be converted into a child-type audiobook format where the voices of the characters are children and the audio rendering is provided to customers/users who are children.

Additionally or alternatively, the content of the audio rendering may be adjusted based on different target customers/users. For example, when an audio rendering is generated for a target customer/user who is a child, the rendering module 130 may replace certain complex words with simpler words that are synonyms for the more complex word.

Embodiments herein identify narratives for associated content segments within the textual content and designate character models for the corresponding narratives. The audio rendering is then generated utilizing the character models in connection with the corresponding narratives. The machine learning methods, devices and computer program products described herein may also designate different intonations to be utilized by one or more of the character models in connection with sections of the corresponding narratives.

In accordance with technical aspects herein, pieces of information of interest are "gleaned" from the textual content which represents the source material. For example, the textual content may be divided into content segments, where each content segment is associated with an individual narrative. Examples of tasks performed by the textual machine learning analysis are: 1. Identifying characters in a fictional novel, 2. Classifying the characters by age, sex, race, nationality and/or basic personality traits, 3. Identifying individual speakers for sections of spoken dialogue, 4. Identifying intonation, such as tonal and emotional quality of dialogue (shouting, whispering, surprise, casual conversation, etc), and 5. Identifying the voice of the narrator as separate from the characters. Based on the information identified from the content segments, the textual machine learning analysis automatically generates an audio rendering of the textual content. For example, the audio rendering may creates a dramatization of a novel or other story with appropriate narration. Each individual character can be assigned an appropriate computer generated voice actor (e.g., an electronically generated voice or an electronic reproduction of a real person's voice).

Optionally, dialogue tags (such as "he said" or "she shouted") may be automatically removed and replaced with appropriate intonation in the correct voice. As a possible embodiment, the textual analysis of a book could be used to automatically generate a Speech Synthesis Markup Language (SSML) audio rendering of the entire book that is well suited to function as a replacement for a professional audio book narrator.

Based on information collected from the textual content, an audio rendering is automatically created, such as a dramatization of a novel with appropriate narration for each character. Each individual character can be assigned an appropriate computer generated voice actor, and/or computer reproduction of an actors voice.

While embodiments are described herein in connection with converting books and other general reading material to audio renderings, alternative embodiments may be applied in connection with other types of textual content. For example, the textual content may include material not otherwise accessible to sight impaired individuals. For example, technical material on webpages, equations and formulas, user manuals, instructional documents and the like may be converted to an audio rendering in accordance with embodiments herein. Different character models may be utilized with different portions of the technical material. For example, different equations, footnotes, headers, sidebars and the like may be converted to audio using one voice (character model), while other content within the document, webpage, etc. is converted to audio using a different voice or multiple different voices (character models).

Audio Rendering Process

Figure 2:
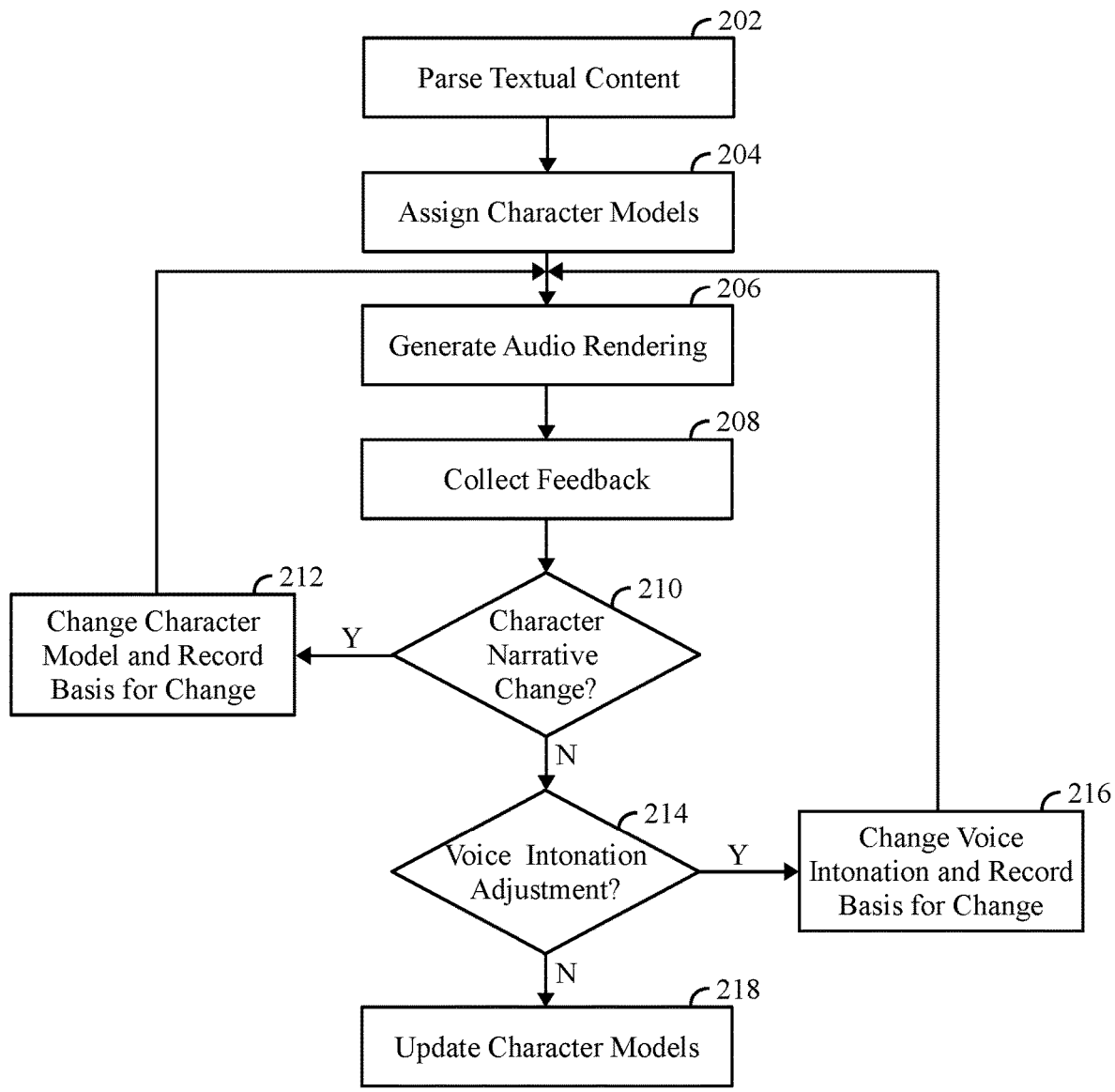
FIG. 2 illustrates a process for generating an audio rendering from textual content in accordance with embodiments herein.

FIG. 2 illustrates a process for generating an audio rendering from textual content in accordance with embodiments herein. The operations of FIG. 2 may be performed by one or more processors, implementing the machine learning algorithm of the rendering model 130 (FIG. 1), of a common electronic device and/or distributed between one or more processors of multiple electronic devices, such as distributed across a network (e.g., the Internet) or within the cloud.

At 202, the one or more processors upload a textual content file and parse through the textual content to identify content segments. The one or more processors identify narratives associated with the content segments. At 204, the one or more processors assign character models to the corresponding narratives of the content segments. At 206, the one or more processors generate an audio rendering of the textual content utilizing the character models in connection with the corresponding narratives for the associated content segments (e.g., an MP3 file, WAV file, SSML file). An example implementation of the operations at 202-206 are described below in more detail in connection with FIG. 3.

At 208, the one or more processors collect feedback in connection with the audio rendering. The feedback received by the processors, implementing the machine learning algorithm, may be provided in various manners. For example, during initial production of a first audio rendering 108 for a particular book, novel, etc., feedback may be provided by production users. Once the initial audio rendering 108 is completed and made available to customers, customers/users may provide additional feedback over time. For example, a wide audience of customers may return ratings, comments and other feedback concerning likes and dislikes in connection with a particular character audio rendering. For example, users may return a thumbs up/down rating, a multiple star based rating and the like. Users may return preferences such as indications as to whether particular voices were realistic, interesting, abrasive, etc.

At 210, the one or more processors determine whether the feedback indicates that a character change should be made in connection with one or more narratives. For example, the feedback may indicate that an original character model, that is assigned to a narrative associated with a child in a book, does not match the narrative for the child. For example, the original character model may correspond to a character that is too old, the wrong gender, and the like. As another example, the original character model may designate an individual having a North American dialect, while the child character within the book should have a Middle Eastern, Indian or Asian dialect. When a character model change is determined at 210, flow moves to 212. Otherwise, flow continues to 214.

At 212, the one or more processors identify a new character model to be utilized in connection with the present narrative. The new character model may be identified in various manners. For example, a user may manually select a particular character model and/or designate one or more characteristics to be utilized in connection with the new character model. Optionally, a new character model may be automatically identified based on the feedback. Additionally or alternatively, the feedback may indicate that the original character model did not exhibit (or sufficiently emphasize) one or more other characteristics of interest. In connection there with, a new character model may be chosen that exhibits and/or emphasizes the characteristic of interest. For example, the feedback may indicate that the original character model is too old, has the wrong dialect, has the wrong personality traits and the like. In response thereto, the processors may automatically identify a new character model associated with a younger character, different or chosen dialect, different or designated personality traits and the like. The new character model is recorded in connection with the associated narrative.

Thereafter, flow returns to 206 where a new audio rendering is generated. At 206, a complete new audio rendering may be generated. Additionally or alternatively, only portions of the original audio rendering may be replaced, such as to merely replace/re-render narrative sections of the audio rendering associated with the new character model. The operations at 206-210 are repeated until appropriate character models are designated for each of the narratives within the textual content.

At 210, when the one or more processors determine that no further character model changes are warranted, flow moves to 214. At 214, the one or more processors determine whether adjustments are warranted to voice intonations for one or more of the character models. When a voice intonation change is determined at 214, flow moves to 216. Otherwise, flow continues to 218.

At 216, the voice intonation is changed to a new voice intonation based on the feedback. The new voice intonations may be identified in various manners. For example, a user may manually select a particular voice intonation and/or designate one or more voice features to be utilized in connection with the voice intonation for one or more character models. Optionally, new voice intonations may be automatically identified based on the feedback. Additionally or alternatively, the feedback may indicate that the original voice intonation did not exhibit (or sufficiently emphasize) one or more voice features of interest. In connection there with, a new voice intonation may be chosen that exhibits and/or emphasizes the voice features of interest. For example, the feedback may indicate that the original voice intonation for a section of narrative is to plain, lacked surprise, was too loud, did not shout and the like. In response thereto, the processors may automatically identify a new voice intonation associated with the section of narrative. The new voice intonation is recorded in connection with the associated section of narrative.

Thereafter, flow returns to 206 where a new audio rendering may be generated. At 206, a complete new audio rendering may be generated. Additionally or alternatively, only portions of the original audio rendering may be updated, such as to merely replace/re-render the section(s) of narrative of the audio rendering associated with the change in voice intonation. The operations at 206-216 are repeated until appropriate voice intonations for each of the character models are designated for each of the sections of narratives within the textual content.

At 218, the voice character models within the character catalog and the intonation catalog are updated based on the operations at 204-214. For example, the character catalog may be updated to indicate a particular character model to be well-suited for certain types of literary forms, such as autobiographies, biographies, comedies, dramas, essays, fantasies, historical fiction, historical nonfiction, novels, poetry, short stories and the like. Optionally, the character catalog may be updated to indicate that a particular character model should not be used with certain types of literary forms. The intonation catalog may be updated to indicate particular intonation features to be utilized with certain types of narratives. For example, the content segment includes descriptors of intonation (e.g., she said, he shouted, she whispered). The intonation catalog may be updated to associate descriptors from the content segment with particular intonations. Thereafter, the process of FIG. 2 ends.

While the foregoing operations are described in a somewhat serial manner, it is recognized that the operations of FIG. 2 may be performed in parallel. It is also recognized that adjustments to intonation and character models may be made at the same time in connection with a particular character and/or content segment. Optionally, the voice intonations associated with any and all sections of narrative for a particular character model may be updated, before moving to another character model/narrative. For example, once a character model is chosen for a particular narrative (e.g., the main character, the narrator, etc.), all sections of the narrative related to the character model may be analyzed to identify any voice intonations corresponding thereto.

Optionally, the operations at 208-210 may be performed independent of generation of an individual audio rendering. For example, as noted above, feedback may be received after completion of production of an individual audio rendering. The feedback may be received from customers/users of the production audio rendering over a long period of time. For example, customers may give a low rating to a particular character who may be too aggressive, talk too fast or slow, or have other undesirable characteristics. Based on the feedback, the character model may be adjusted for future books, without necessarily re-creating the audio rendering already available to the public. Optionally, the audio rendering may be updated and rereleased.

Figure 3:
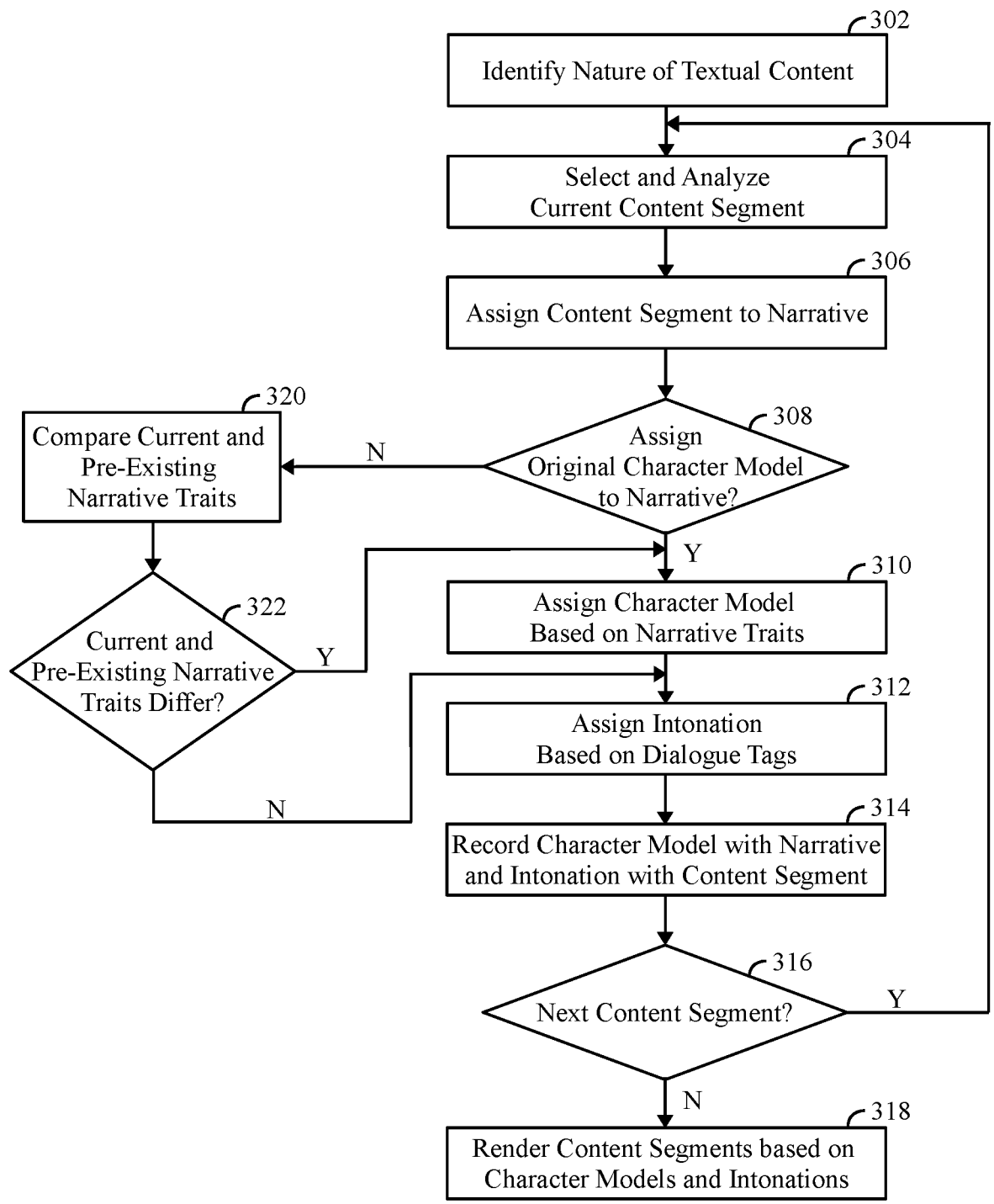
FIG. 3 illustrates a process for generating an audio rendering from textual content in accordance with embodiments herein.

FIG. 3 illustrates a process for generating an audio rendering from textual content in accordance with embodiments herein. The operations of FIG. 3 may be performed by one or more processors of a common electronic device and/or distributed between one or more processors of multiple electronic devices, such as distributed across a network (e.g., the Internet) or within the cloud.

At 302, the one or more processors identify the nature of a textual content. For example, non-limiting examples of the nature include whether the textual content represents an email, text message, book, magazine, text within a webpage, text within social media and the like. The nature may also be dependent upon the literary form, such as whether the textual content represents an autobiography, biography, comedy, drama, essay, fantasy, historical fiction, historical nonfiction, novel, poetry, short story, children's story and the like. The nature of the textual content may be utilized to select a group or bank of character models, that are used by the subsequent operations of FIG. 3.

At 304, the one or more processors select one or more content segments and analyze the one or more content segments for traits, such as associated with a narrative. A beginning and end of a content segment may be identified based on dialogue tags. For example, dialogue tags may represent certain types of punctuation (e.g., quotation marks). Dialogue tags may represent predetermined statements (e.g., he said, she said), a beginning of a new paragraph, predetermined headers, chapter breaks and the like. As one example, the beginning and end of a content segment may be identified as beginning and ending quotation marks. As another example, the beginning and ending of a content segment may be identified as a separate paragraph preceded or ending with a predetermined statement (e.g., John said, Lisa remarked, etc.).

At 306, the one or more processors assigned the content segment to a particular narrative associated with a particular character. As one example, the content segment may be utilized to initiate a new narrative. Alternatively, the content segment may be assigned to a pre-existing narrative. The content segment may be assigned to a new or pre-existing narrative based on the dialogue tags, based on the subject matter of the content segment and/or based on other criteria. For example, each quotation that begins or ends with "John said", will be assigned to a narrative associated with the character "John". Additionally or alternatively, the content segments may be analyzed to identify characteristics or traits within the content segment (e.g., something a child would say, something a parent would say, a response to a preceding statement of another character). Additionally or alternatively, content segments may be analyzed in combination, such as in connection with a conversation, dialogue or descriptive interaction between particular characters. For example, a group of content segments represent a conversation between two characters (e.g., Kate and Sophie). Accordingly, the content segments may be assigned to a narrative assigned to Kate or a narrative assigned to Sophie based upon the order and interrelation of the content segments within the conversation. Additional and alternative analysis and criteria may be utilized to determine which narrative is associated with a particular content segment.

At 308, the one or more processors determine whether a character model has already been assigned to the narrative. When a character model needs to be assigned to a narrative, flow moves to 310. When a character model has already been assigned to the narrative, flow moves to 312.

At 310, a character model is assigned to the narrative based on one or more narrative traits and/or a nature of the textual content. For example, when the nature of the textual content indicates that the text represents a children's book, a character model associated with a child's voice may be assigned to the narrative. As a further example, when the narrative traits indicate that the narrative corresponds to a boy, a character model may be assigned that is associated with a boys voice. Numerous narrative traits may be considered in selecting the character model.

Optionally, narrative traits may be afforded different weights, with a weighted combination (e.g., weighted sum) utilized to select the character model. For example, it may be determined that gender and an urban/rule background are important factors, while nationality and/or dialect are unimportant factors. The weighted combination of the narrative factors may be utilized to identify the most suitable character model.

At 312, a voice intonation is assigned to the present content segment based on one or more dialogue tags associated with the content segment. For example, when a dialogue tag indicates that the character is speaking with a particular type of intonation (e.g., shouting, whispering, angry, talking fast, talking slow or otherwise), a corresponding voice intonation is assigned.

At 314, the one or more processors record the character model in connection with the narrative and record the voice intonation in connection with the current content segment. At 316 the one or more processors determine whether to analyze the next content segment. If so, flow returns to 304, and the operations of 304-316 are continuously repeated for all or multiple content segments within the textual content. When all or a predetermined number of the content segments have been analyzed, flow moves from 316 to 318.

At 318, the one or more processors at 314 render some or all of the content segments based on the corresponding character models and intonations to form an audio rendering for the corresponding textual content. As a possible embodiment, the textual analysis of a book could be used to automatically generate a Speech Synthesis Markup Language (SSML) file of the entire book that is well suited to function as a replacement for a professional audio book narrator. Optionally, only a portion of the SSML file may be updated. Optionally, at 318, the dialogue tags (such as "he said" or "she shouted") may be automatically removed and replaced with appropriate intonation in the correct voice.

Optionally, the audio rendering operation described in connection with 318 may be performed at 314 in connection with each individual content segment, thereby building an audio rendering through an iterative process.

Returning to 308, when the processors determined that a character model has already been assigned to the narrative, flow branches to 320. At 320, the one or more processors review the narrative traits of the current content segment and compare the current narrative traits with pre-existing narrative traits associated with the previously assigned character model. At 322, the one or more processors determine whether the current narrative traits differ from the pre-existing narrative traits by an amount sufficient to warrant a change in the character model. For example, the pre-existing narrative traits associated with a narrative may merely indicate that the character is an adult male. A baseline character model may be assigned for an adult male having no particular ethnic background or nationality. A new narrative trait may be identified with the current content segment indicating a specific ethnic background or nationality for the character. Consequently, at 322, the processors may determine that the baseline character model should be replaced or updated with a new character model that more closely resembles the ethnic background or nationality of the particular character.

At 322, when a change in character model is indicated, flow moves to 310. As explained above, a new character model is assigned based on the narrative traits of the current segment. Alternatively, when a change in character model is not indicated at 322, flow moves to 312 where and intonation is assigned to the current content segment based on related dialogue tags.

In accordance with embodiments herein, the processes of FIGS. 2 and 3 identify individual characters to be utilized with different narratives within a textual content. For example, each of the characters within a fictional novel may be assigned a separate character model. The characters associated with each of the different character models to be classified based on age, sex, race, nationality, and the like. Individual speakers may be utilized for different sections of spoken dialogue. Additionally, tonal, emotional and other changes in dialogue may be applied to different sections of the narrative associated with an individual character and/or multiple characters. The narrator may be assigned as one character model, separate and apart from characters models associated with other characters within a novel, story and the like. In accordance with embodiments herein, the processes of void assigning the same voice to multiple characters within a book, story or otherwise.

Figure 4:
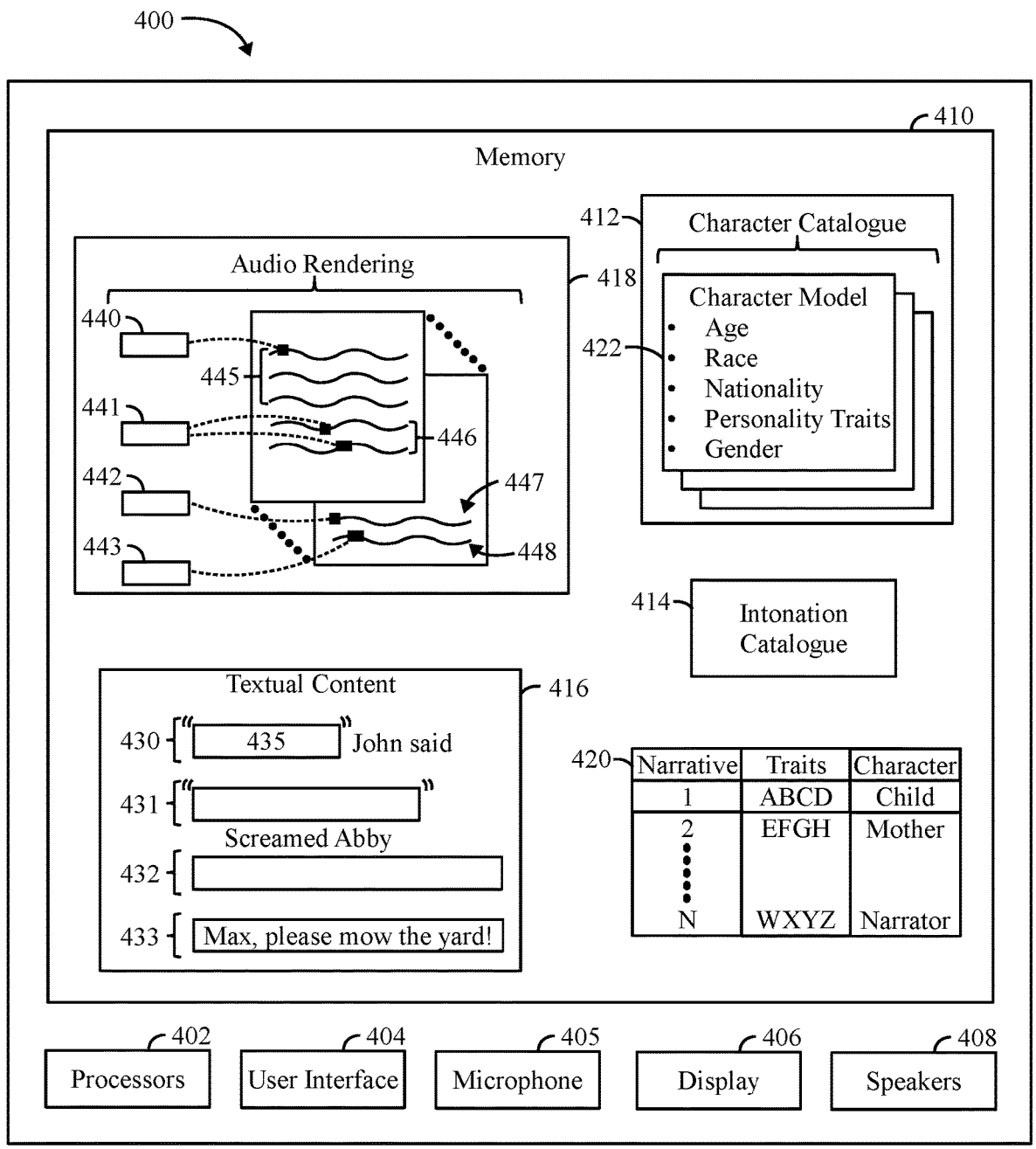
FIG. 4 illustrates a block diagram of an electronic device, such as the resource manager that utilizes machine learning analysis to generate audio renderings from textual content in accordance with embodiments herein.

FIG. 4 illustrates a block diagram of an electronic device, such as the resource manager 102 (FIG. 1) that utilizes machine learning analysis to generate audio renderings from textual content in accordance with embodiments herein. The electronic device 400 includes one or more processors 402, a user interface 404, a display 406, speakers 408 and memory for 10. The user interface 404 receives user inputs, and the display 406 displays textual content, to implement embodiments described herein. The processors 402 operate instructions stored in the memory 404 in connection with implementing the machine learning of the rendering module 130 in accordance with embodiments herein. The speakers 408 output audio renderings, among other things.

The memory 410 stores a character catalog 412, an intonation catalog 414, textual content 416, audio renderings 418 and narrative tables 420 as described herein. The character log 412 stores one or more character models 422 that are associated with different types of characters. Each character model 422 have corresponding sets of characteristics that define a particular character. For example, the characteristics may designate an age, gender/sex, race, nationality, dialect and other basic personality traits for an individual character. Optionally, a user may program the characteristics of a character model using the user interface 404. Additionally or alternatively, the microphone 405 may record voice inputs that are utilized by the processors 402 to build character models. For example, a character model may be associated with a particular well-known actor or actress or athlete, who records (through the microphone 405) a collection of predefined statements and speech. The recordings from the actor/athlete/actress are then used when converting text into audio, such as when playing back a book or other textual content.

The intonation catalog 414 stores a collection of voice features that may be utilized to define desired voice intonations. For example, the voice features may define tonal, emotional and other qualities of dialogue, including but not limited to accent, accentuation, stress, modulation, cadence, pitch, inflection, and/or timbre. Non-limiting examples of voice features include shouting, whispering, expressing surprise, casual conversation and the like.

FIG. 4 illustrates textual content 416 that may be stored as a content file in the memory 410. For example, the textual content 416 may represent a book, novel, magazine, webpage, email, text message, social media message and the like. As explained herein, the textual content 416 is segmented or parsed into a collection of successive content segments.

FIG. 4 illustrates example content segments 430-433. The content segment 430 includes quotation marks as beginning and ending dialogue tags with a textual statement 435 there between. The content segment 430 is followed by the statement "John said" (another dialogue tag) that indicates the character speaking. As explained herein, the processors may utilize the dialogue tag quotation marks to identify the beginning and ending of the text to be rendered into audio. The statement "John" and/or "John said" may be identified as all or a part of a dialogue tag and/or a narrative trait. For example, the statement "John" and/or "John said" may represent a narrative trait, indicating that the character is male. The statement "said" may represent a dialogue tag indicating that the male is speaking in a normal conversational tone. The dialogue tag "John said" may be removed from the audio rendering.

As another example, the content segment 431 may include a text statement within quotes followed by the phrase "screamed Abby." The beginning and ending quotation marks may be utilized as dialogue tags to identify the text statement to be rendered into audio. Optionally, the statement "screamed Abby" may be utilized as the sole dialogue tag, without reference to the quotation marks. When utilizing a phrase as the sole dialogue tag, the processors may identify preceding or succeeding text that is associated with the dialogue tag "screamed Abby." Additionally or alternatively, the term "screamed" may be utilized as a dialogue tag to indicate an elevated intonation, while the word "Abby" may be used as a narrative trait to indicate a female speaker. The dialogue tag "screamed Abby" may be removed from the audio rendering as the intonation would include screaming.

The content segment 432 represents a complete paragraph where the paragraph start/end paragraph marks are used as the dialogue tags, without regard for quotation marks or other punctuation. The subject matter within the content segment 432 may be analyzed to identify a dialogue tag to be utilized for intonation and to identify narrative traits to be utilized to assign a character model.

The content segment 433 represents a statement that includes a name followed by a statement and the exclamation point "!". The processors may analyze the subject matter within the content segment 433 to identify a character to whom the statement is addressed. Based upon the nature of the statement and the surrounding content, the processors may determine the character making the statement (e.g., a mother, father, etc.). The processors also analyze the subject matter to identify the exclamation point as a content segment indicating a corresponding elevated intonation (e.g., demanding, angry).

The processors step/parse through the content segments within the textual content 416 and build a narrative table 420 corresponding to one or more separate narratives within the textual content. For example, a narrative may correspond to all of the statements made by a particular character. Additionally or alternatively, a narrative may correspond to the text presented from a point of view (e.g., the narrator), from a primary characters first person point of view and the like. In the example of FIG. 4, narratives 1, 2, . . . N are illustrated, with the narrative 1 having traits A, B, C, D and assigned to character model for a child character. The narrative 2 has traits E, F, G, H and is assigned to a character model for a mother, while narrative N has traits W, X, Y, Z and is assigned to a character model for a narrator.

As the textual content 416 is analyzed, various traits associated with an individual narrative are identified. Based on the narrative traits, a character model is designated. As additional narrative traits are identified, the character model may be updated or replaced to fine-tune or better define a character associated with the narrative. For example, during a first chapter of a novel, a first portion of a narrative may be defined to correspond to a baseline character model associated with an adult female. In later chapters, additional portions of the narrative from the same character may indicate that the adult female has a particular dialect, nationality, ethnic background and the like. Accordingly, the baseline character model may be updated or replaced to better correspond to the character.

The processors step/parse through the textual content 416 and build the narrative table 420 with character models for each narrative. The processors then generate an audio rendering 418 that utilizes corresponding character models 422 for each narrative within the narrative table 420. The audio rendering 418 also utilizes different intonations in connection with corresponding content segments, where the intonations are obtained from the intonation catalog 414 as indicated by the dialogue tags. The audio rendering 418 may be stored in various formats and/or output from a speaker in real time. In the example of FIG. 4, the audio rendering 418 is illustrated as an audio file that includes embedded data 440-443 indicating the character model and intonation associated with subsequent content segments 445-448.

Figure 5:
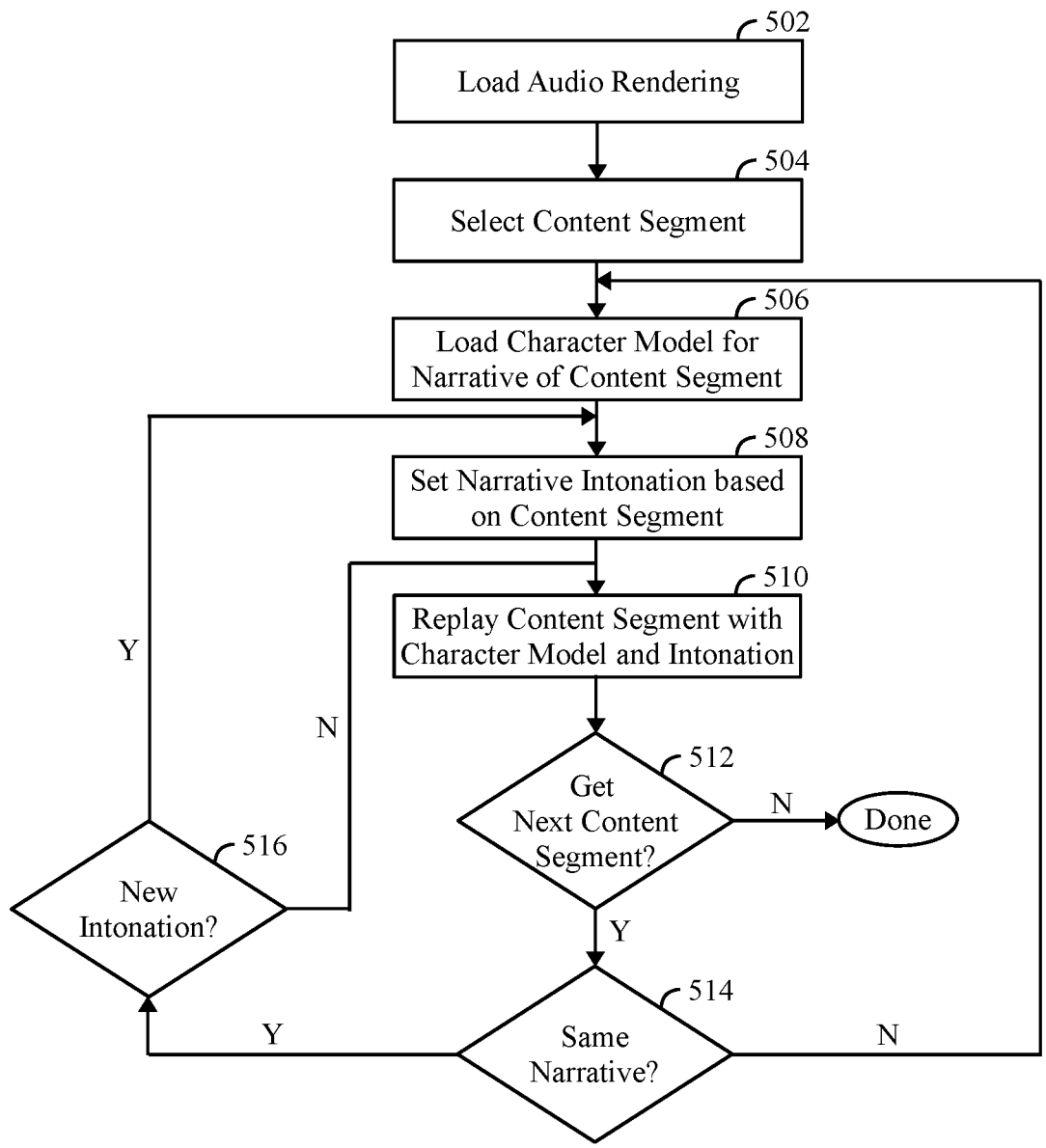
FIG. 5 illustrates a process for playing back an audio rendering in accordance with embodiments herein.

Audio rendering may be played back in various manners. For example, an MP3 file or WAV file may be played back in a simple manner without further reference to particular character models. Optionally, the audio rendering may be built in a manner where the playback electronic device accesses select character models and intonation information. FIG. 5 is an example of a model based on playback process.

FIG. 5 illustrates a process for playing back an audio rendering in accordance with embodiments herein. By way of example, the process of FIG. 5 may be implemented on one or more electronic devices described herein. At 502, one or more processors load the audio rendering and corresponding character models, and intonations. For example, the audio rendering may represent a file stored in various formats (e.g., a SSML file). At 504, the one or more processors select a current content segment from the audio rendering. With reference to FIG. 4, the processors may select the content segment 445.

At 506, the one or more processors load a character model associated with the narrative for the content segment. For example, the content segment 445 may correspond to narrative 2 which is associated with a mother character. Consequently, at 506, the processors load a character model for the mother character.

At 508, the one or more processors set the intonation to be used by the character model in connection with the current content segment. At 510, the one or more processors replay the content segment using the character model and intonation set at 506-508. At 512, the one or more processors determine whether to continue. If the processes are to continue, at 512, the one or more processors obtain a next content segment. Otherwise, the process ends.

At 514, the one or more processors review the next content segment and determine whether the next content segment corresponds to the same narrative as the prior content segment. If so, flow branches to 516. When the next content segment corresponds to a different narrative, flow returns to 506 where a new character model is loaded. When flow branches to 516, the one or more processors determine whether the next content segment utilizes the same intonation as the prior content segment or a new intonation. When a new intonation is utilized, flow moves to 508. Otherwise, flow moves to 510. The operations at 506-516 are continuously repeated to playback the audio rendering.

It is recognized that the process of FIG. 5 represents one manner by which an audio rendering may be replayed. Additional and alternative techniques may be utilized for replaying an audio rendering, such as simply playing an MP3 or WAV file.

Figure 6:
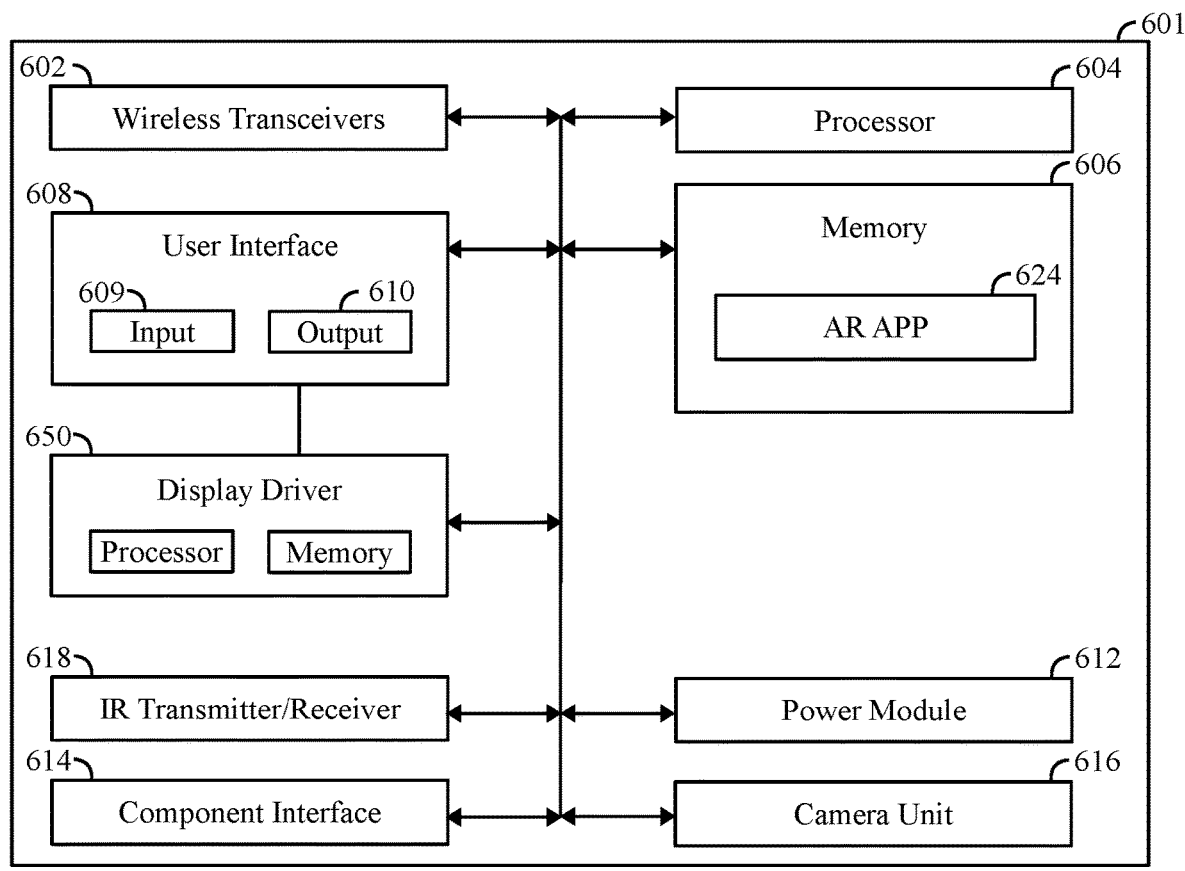
FIG. 6 illustrates a simplified block diagram of internal components of an electronic device configured in accordance with embodiments herein.

FIG. 6 illustrates a simplified block diagram of internal components of an electronic device 601 configured in accordance with embodiments herein. The device 601 may be utilized to implement the processes of FIGS. 2 and 3 to generate an audio rendering and/or the process of FIG. 5 to replay an audio rendering. The device 601 may implement the rendering module 130 of FIG. 1. When the device 601 is utilized to generate an audio rendering, optionally, the memory 606 may store all or a portion of the content described herein within memory 410 in connection with FIG. 4.

The device 601 includes components such as one or more wireless transceivers 602, one or more processors 604 (e.g., a microprocessor, microcomputer, application-specific integrated circuit, etc.), one or more local storage medium (also referred to as a memory) 606, a user interface 608 which includes one or more input devices 609 and one or more output devices 610, a power module 612, a component interface 614 and a camera unit 616. All of these components can be operatively coupled to one another, and can be in communication with one another, by way of one or more internal communication links, such as an internal bus. The camera unit 616 may capture one or more frames of image data.

The input and output devices 609, 610 may each include a variety of visual, audio, and/or mechanical devices. For example, the input devices 609 can include a visual input device such as an optical sensor or camera, an audio input device such as a microphone, and a mechanical input device such as a keyboard, keypad, selection hard and/or soft buttons, switch, touchpad, touch screen, icons on a touch screen, a touch sensitive areas on a touch sensitive screen and/or any combination thereof. Similarly, the output devices 610 can include a visual output device, one or more light emitting diode indicators, an audio output device such as a speaker, alarm and/or buzzer, and a mechanical output device such as a vibrating mechanism. The display may be touch sensitive to various types of touch and gestures. As further examples, the output device(s) 610 may include a touch sensitive screen, a non-touch sensitive screen, a text-only display, a smart phone display, an audio output (e.g., a speaker or headphone jack), and/or any combination thereof. Optionally, the input devices 609 may include one or more touch sensitive layers provided on the front and/or rear sides of the display. The output devices 610 include a flexible display layer, such as an OLED display.

The transceiver 602 can utilize a known wireless technology for communication. Exemplary operation of the wireless transceivers 602 in conjunction with other components of the device 601 may take a variety of forms and may include, for example, operation in which, upon reception of wireless signals, the components of device 601 detect communication signals from secondary devices and the transceiver 602 demodulates the communication signals to recover incoming information, such as responses to inquiry requests, voice and/or data, transmitted by the wireless signals. The processor 604 formats outgoing information and conveys the outgoing information to one or more of the wireless transceivers 602 for modulation to communication signals. The wireless transceiver(s) 602 convey the modulated signals to a remote device, such as a cell tower or a remote server (not shown).

The memory 606 can encompass one or more memory devices of any of a variety of forms (e.g., read only memory, random access memory, static random access memory, dynamic random access memory, etc.) and can be used by the processor 604 to store and retrieve data. The data that is stored by the memory 606 can include, but need not be limited to, operating systems, applications, user collected content and informational data. Each operating system includes executable code that controls basic functions of the device, such as interaction among the various components, communication with external devices via the wireless transceivers 602 and/or the component interface 614, and storage and retrieval of applications and data to and from the memory 606. Each application includes executable code that utilizes an operating system to provide more specific functionality for the communication devices, such as file system service and handling of protected and unprotected data stored in the memory 606.

An audio rendering (AR) application 624 is stored in the memory 606. The AR application 624 includes program instructions accessible by the one or more processors 604 to direct a processor 604 to implement the methods, processes and operations described herein including, but not limited to the methods, processes and operations illustrated in the Figures and described in connection with the Figures. The AR application 624 manages operation of the processor 604, display driver 650 and/or a video card in connection with displaying desired content on the primary and secondary (e.g., edge and/or rear) viewing regions of the flexible display layer. The AR application 624 may utilize textual machine learning to analyze textual content to identify narratives for associated content segments of the textual content. The AR application 624 may utilize textual machine learning to designate character models for the corresponding narratives; and generate an audio rendering of the textual content utilizing the character models in connection with the corresponding narratives for the associated content segments.

Other applications stored in the memory 606 include various application program interfaces (APIs), some of which provide links to/from the cloud hosting service. The power module 612 preferably includes a power supply, such as a battery, for providing power to the other components while enabling the device 601 to be portable, as well as circuitry providing for the battery to be recharged. The component interface 614 provides a direct connection to other devices, auxiliary components, or accessories for additional or enhanced functionality, and in particular, can include a USB port for linking to a user device with a USB cable.

Optionally, the device 601 may include an infrared (IR) transmitter/receiver 618 that may be utilized in connection with controlling one or more secondary devices through transmission and reception of IR signals. A display driver 650 is coupled to the processor 604 and configured to manage display of content on a display.

As described herein, embodiments utilize textual machine learning to analyze textual content to identify narratives for associated content segments of the textual content, and to designate character models for the corresponding narratives. Optionally, methods, devices and computer program products may be implemented in accordance with embodiments herein that analyze textual content to identify narratives for associated content segments of the textual content and/or designate character models for the corresponding narratives, utilizing techniques other than textual machine learning.

CLOSING STATEMENTS

Before concluding, it is to be understood that although e.g., a software application for undertaking embodiments herein may be vended with a device such as the system, embodiments herein apply in instances where such an application is e.g., downloaded from a server to a device over a network such as the Internet. Furthermore, embodiments herein apply in instances where e.g., such an application is included on a computer readable storage medium that is being vended and/or provided, where the computer readable storage medium is not a carrier wave or a signal per se.

As will be appreciated by one skilled in the art, various aspects may be embodied as a system, method or computer (device) program product. Accordingly, aspects may take the form of an entirely hardware embodiment or an embodiment including hardware and software that may all generally be referred to herein as a "circuit," "module" or "system." Furthermore, aspects may take the form of a computer (device) program product embodied in one or more computer (device) readable storage medium(s) having computer (device) readable program code embodied thereon.

Any combination of one or more non-signal computer (device) readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a dynamic random access memory (DRAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of network, including a local area network (LAN) or a wide area network (WAN), or the connection may be made through other devices (for example, through the Internet using an Internet Service Provider) or through a hard wire connection, such as over a USB connection. For example, a server having a first processor, a network interface, and a storage device for storing code may store the program code for carrying out the operations and provide this code through its network interface via a network to a second device having a second processor for execution of the code on the second device.

The units/modules/applications herein may include any processor-based or microprocessor-based system including systems using microcontrollers, reduced instruction set computers (RISC), application specific integrated circuits (ASICs), field-programmable gate arrays (FPGAs), logic circuits, and any other circuit or processor capable of executing the functions described herein. Additionally or alternatively, the units/modules/controllers herein may represent circuit modules that may be implemented as hardware with associated instructions (for example, software stored on a tangible and non-transitory computer readable storage medium, such as a computer hard drive, ROM, RAM, or the like) that perform the operations described herein. The above examples are exemplary only, and are thus not intended to limit in any way the definition and/or meaning of the term "controller." The units/modules/applications herein may execute a set of instructions that are stored in one or more storage elements, in order to process data. The storage elements may also store data or other information as desired or needed. The storage element may be in the form of an information source or a physical memory element within the modules/controllers herein. The set of instructions may include various commands that instruct the units/modules/applications herein to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to user commands, or in response to results of previous processing, or in response to a request made by another processing machine.

It is to be understood that the subject matter described herein is not limited in its application to the details of construction and the arrangement of components set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

It is to be understood that the above description is intended to be illustrative, and not restrictive. For example, the above-described embodiments (and/or aspects thereof) may be used in combination with each other. In addition, many modifications may be made to adapt a particular situation or material to the teachings herein without departing from its scope. While the dimensions, types of materials and coatings described herein are intended to define various parameters, they are by no means limiting and are illustrative in nature. Many other embodiments will be apparent to those of skill in the art upon reviewing the above description. The scope of the embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects or order of execution on their acts.

What is claimed is:

1. A computer implemented method, comprising:
    under control of one or more processors configured with specific executable program instructions,
    analyzing textual content to identify narratives for associated content segments of the textual content;
    utilizing textual machine learning to designate character models for the corresponding narratives based on one or more of a trait of the narrative and/or a nature of the textual content, wherein the designating utilizes the textual machine learning to designate different intonations to be utilized by at least one of the character models in connection with sections of the corresponding narrative based on traits of the narrative; and
    generating an audio rendering of the textual content utilizing the character models in connection with the corresponding narratives for the associated content segments.

2. The method of claim 1, wherein the designating utilizes the textual machine learning to designate the character models to simulate different characters within a book based on traits of the narrative, the characters differing from one another by one or more of age, sex, race, nationality or personality traits.

3. The method of claim 1, wherein the content segments represent sections of spoken dialogue by different individual speakers, and wherein the textual machine learning assigns different character models for the individual speakers based on traits of the narrative.

4. The method of claim 1, further comprising identifying a dialogue tag associated with the content segment and assigning at least one of the intonations based on dialogue tag.

5. The method of claim 1, wherein the textual content represents a story and the audio rendering includes a first character model representing a narrator and secondary character models representing characters within the story, the textual machine learning designating the first and second character models based on traits of the narrative.

6. The method of claim 1, wherein the textual content includes dialogue tags, the method further comprising removing the dialogue tags from the audio rendering.

7. The method of claim 1, further comprising receiving feedback regarding one or more character models in the audio rendering and adjusting the one or more character models based on the feedback.

8. A device, comprising:
a processor;
a memory storing program instructions accessible by the processor;
wherein, responsive to execution of the instructions, the processor performs the following:
analyzing textual content to identify narratives for associated content segments of the textual content;
utilizing textual machine learning to designate character models for the corresponding narratives based on traits of the narrative, wherein the designating utilizes the textual machine learning to designate different intonations to be utilized by at least one of the character models in connection with sections of the corresponding narrative based on traits of the narrative; and
generating an audio rendering of the textual content utilizing the character models in connection with the corresponding narratives for the associated content segments.

9. The device of claim 8, wherein the processor designates the character models to simulate different characters within a book, the characters differing from one another by one or more of age, sex, race, nationality or personality traits, the textual machine learning designating the character models based on the traits of the narrative.

10. The device of claim 8, wherein the processor steps through content segments and assigns the content segment to a new narrative or a pre-existing narrative.

11. The device of claim 8, wherein the processor compares current and pre-existing narrative traits to determine whether to update or replace the corresponding character model.

12. The device of claim 8, wherein the textual content represents a story and the audio rendering includes a first character model representing a narrator and secondary character models represent characters within the story, the textual machine learning designating the first and second character models based on traits of the narrative.

13. The device of claim 8, wherein the textual content includes dialogue tags, the processor to remove the dialogue tags from the audio rendering.

14. The device of claim 8, wherein the processor to receive feedback regarding one or more character models in the audio rendering and adjust the one or more character models based on the feedback.

15. A computer program product comprising a non-signal computer readable storage medium comprising computer executable code, which when executed by a processor performs:
analyzing textual content to identify narratives for associated content segments of the textual content;
utilizing textual machine learning to designate character models for the corresponding narratives based on one or more of a trait of the narrative and/or a nature of the textual content, wherein the designating utilizes the textual machine learning to designate different intonations to be utilized by at least one of the character models in connection with sections of the corresponding narrative based on traits of the narrative; and
generating an audio rendering of textual content utilizing character models in connection with corresponding narratives.

16. The computer program product of claim 15, wherein the computer executable code comprises the character models to simulate different characters within a book based on the traits of the narrative, the characters differing from one another by one or more of age, sex, race, nationality or personality traits.

17. The computer program product of claim 15, wherein the content segments represent sections of spoken dialogue by different individual speakers, and wherein the computer executable code to assign different character models for the individual speakers based on the traits of the narrative.

* * * * *